United States Patent [19]

Brown et al.

[11] 3,999,190

[45] Dec. 21, 1976

[54] TEMPERATURE CONTROL SYSTEM FOR INK JET PRINTER

[75] Inventors: Michael K. Brown, Tecumseh; Earl P. Maidment, Royal Oak; David E. Lundquist, Birmingham; Ronald G. Shell, Dearborn Heights, all of Mich.

[73] Assignee: Burroughs Corporation, Detroit, Mich.

[22] Filed: Oct. 22, 1975

[21] Appl. No.: 624,922

[52] U.S. Cl. .......................... 346/140 R; 219/302; 219/331; 219/501

[51] Int. Cl.² ...................................... G01D 15/18

[58] Field of Search ............ 346/75, 140; 219/305, 219/299, 302, 331, 501, 497

[56] References Cited

UNITED STATES PATENTS

| | | | |
|---|---|---|---|
| 3,107,285 | 10/1963 | Knapp | 219/501 X |
| 3,443,060 | 5/1969 | Smith | 219/302 |

OTHER PUBLICATIONS

Ruddy, G. A.; *Viscosity Control Circuit*, IBM Tech. Disc. Bulletin, vol. 16, No. 10, Mar. 1974, p. 3295.

*Primary Examiner*—Joseph W. Hartary
*Attorney, Agent, or Firm*—Carl Fissell, Jr.; G. Gregory Schivley; Edwin W. Uren

[57] ABSTRACT

An ink jet printer has a printing head which contains at least one cavity with a discharge orifice therein for dispersing droplets of ink onto a medium for printing thereon. Means are disclosed herein for maintaining the temperature of the ink in the cavity at a preselected value prior to dispersement from the discharge orifice. Preferably, the ink is heated by an electrical heating rod mounted in the printing head adjacent to the cavity. Means are also provided for sensing the temperature of the ink in the cavity. The heating rod is selectively energized to maintain the ink at the preselected temperature by means of a feedback control circuit coupled with the sensing means.

7 Claims, 9 Drawing Figures

HEATER DRIVER

TEMPERATURE CONTROL SYSTEM FOR INK JET PRINTER

CROSS REFERENCE TO RELATED APPLICATION

Reference is made herein to U.S. patent application Ser. No. 577,667, entitled "Liquid Jet Droplet Generator", by Lundquist et al, filed May 15, 1975, and which has the same assignee as the present invention.

BACKGROUND OF THE INVENTION

This invention relates generally to printing mechanisms. More particularly, it relates to an ink jet printer having a control system which maintains the temperature of the ink therein at a preselected temperature.

In an ink jet printer, the viscosity of the ink just prior to dispersement from the printing head must be accurately controlled in order to maintain proper droplet formation. It has heretofore been suggested to provide means for controlling the proper amount of a dilutent, such as water, to be added to the ink in order to maintan proper viscosity. We have discovered that the viscosity of the ink can be even more accurately controlled by maintaining the ink at a preselected temperature prior to dispersement onto the printing medium. The referenced patent application Ser. No. 577,667 discloses and claims an ink jet printer of which this invention is an improvement thereon. By controlling the viscosity of the ink via the apparatus and electrical circuitry as set forth in this invention, an even finer resolution of the characters provided by such an ink jet printer can be obtained.

OBJECT AND SUMMARY OF THE INVENTION

Therefore, it is the primary object of this invention to provide means in an ink jet printer for maintaining the temperature of the ink at a preselected value in order to maintain accurate control of the viscosity of the ink just prior to droplet generation.

This and other objects of this invention are preferably accomplished through the use of an electrical heating rod mounted in the printing head adjacent to the cavity in which the ink is collected just prior to droplet generation. Preferably, the heating rod also includes a surrounding heat sink sleeve having a plurality of radially extending rib portions which define a tortuous groove in the outer surface of the sleeve. The heating rod is mounted in a bore in the printing head in such manner that the ribs abut the walls of the bore to form a sealed channel defined by the groove for flowing ink therethrough. The sleeve serves as a heat exchanger for transferring an evenly distributed amount of heat to the ink from the heating rod. Sensing means are also preferably provided which sense the temperature of the ink just prior to droplet generation. The sensor output is coupled into a feedback control circuit which includes a temperature selection portion which provides an output representative of the temperature at which the ink is desired to be maintained. The temperature selection circuit output is compared with the output of the sensing means and produces a signal indicative of the comparison. This signal is fed back to the heating rod input through a low heat dissipating driver circuit to selectively energize the heating rod to maintain the temperature of the ink at the preselected value. The heating rod is preferably energized by a series of digital pulses having a frequency proportional to the heat required of the heating rod to maintain the temperature of the ink at the preselected temperature.

DESCRIPTION OF A PREFERRED EMBODIMENT

Figure 1:
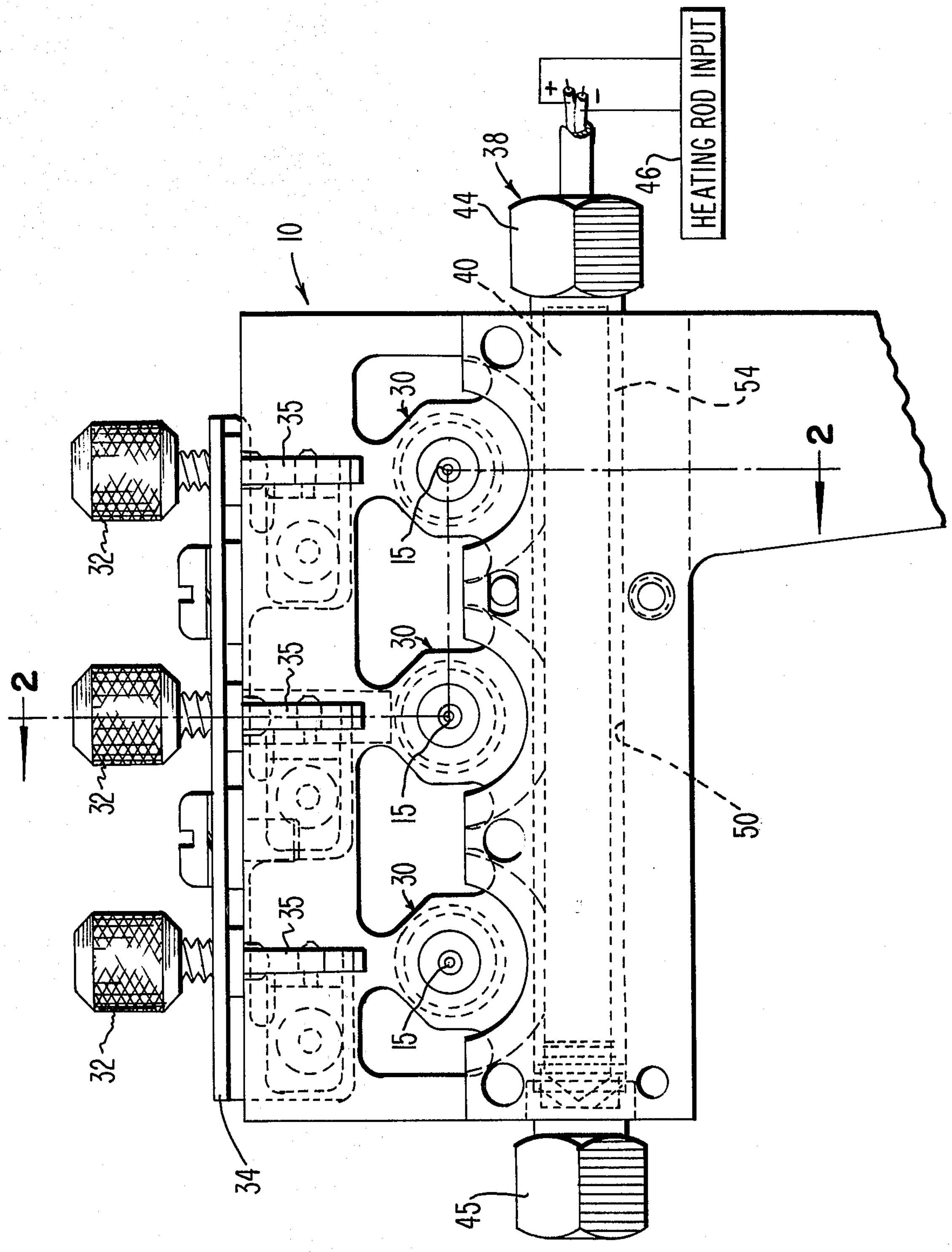
FIG. 1 is a frontal plan view showing a printing head for an ink jet printer in which a heating rod embodied in the present invention has been mounted.
Figure 2:
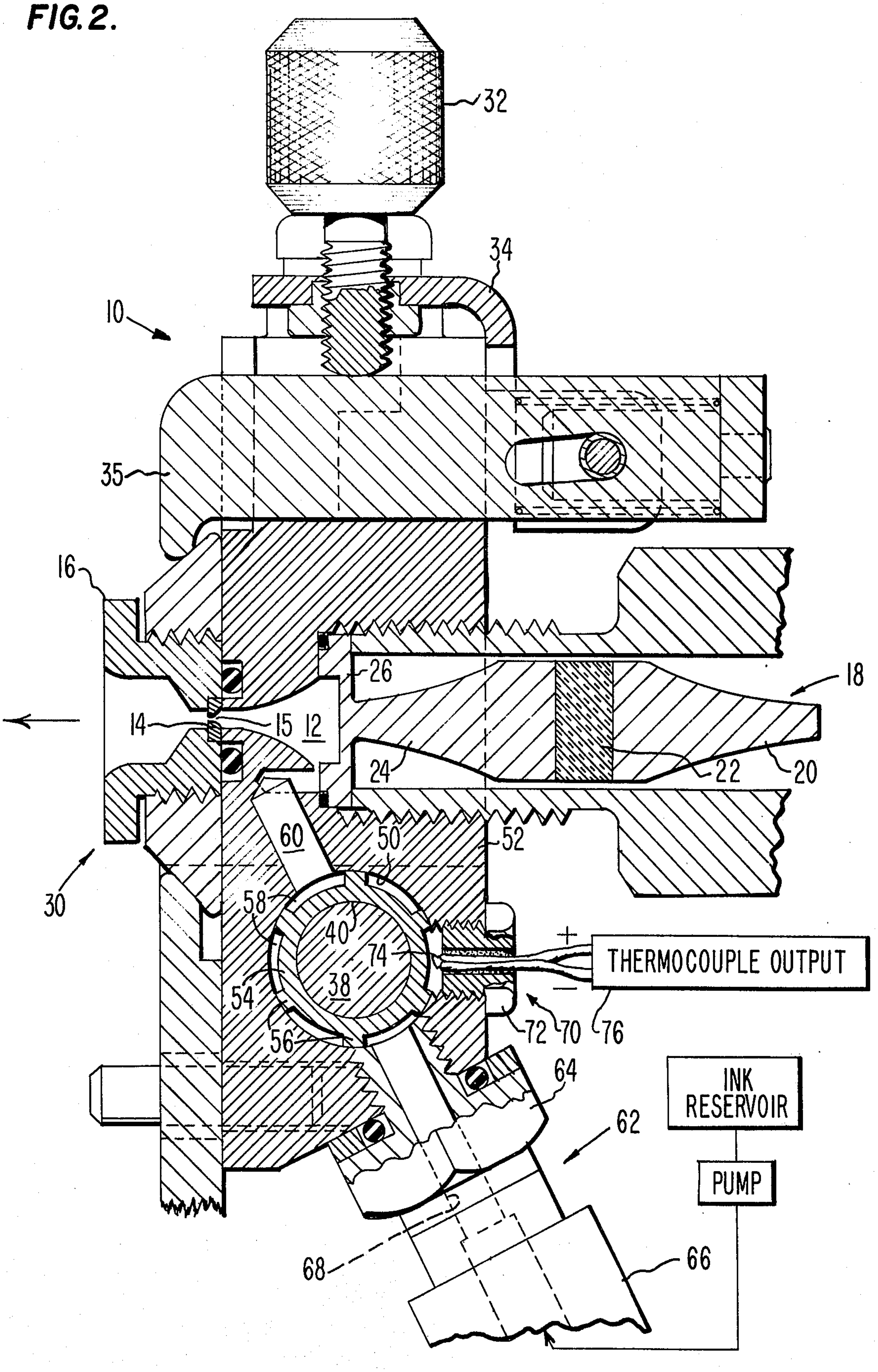
FIG. 2 is a sectional view along the lines 2—2 of FIG. 1.

Referring now to the drawings, especially FIGS. 1 and 2, there is shown an example of a printing head 10 which illustrates one type of ink jet printing system in which the inventive concepts of this invention may be used. It should be noted that any of the commercially available ink jet printers may also incorporate the present invention. The operation of an ink jet printer incorporating printing head 10 has been more particularly described and claimed in U.S. patent applicatiion Ser. No. 577,667 entitled "Liquid Jet Droplet Generator", by Lundquist et al, filed May 15, 1975, which is assigned to the same assignee as the present invention. Consequently, printing head 10 will be described only in connection with its cooperation with the present invention. A more detailed description may be had by referring to the above mentioned patent application.

Printing head 10 is that assembly which surrounds ink cavity 12. Cavity 12 includes an injection ink nozzle 14 including a discharge orifice 15 at the smaller end of the cavity. A holder 16 is threaded into the printing head 10 to hold nozzle 14 in place. Printing head 10 also houses a vibratory component 18. As is more fully described in the above referenced patent application, vibratory component 18 includes a rear horn 20, a crystal transducer 22 and a front horn 24. Front horn 24 includes a diaphragm portion 26 which closes one end of cavity 12. Vibratory component 18 produces pressure oscillations which are transmitted to the ink located in cavity 12. The oscillations force the ink from cavity 12 and disperses the ink from orifice 15 in the form of spaced droplets which may be deflected by opposed electrically charged plates to form characters on a printing medium, such as paper. As can be seen in FIG. 1, there is illustrated, in this embodiment, three spaced ink jets 30 located in printing head 10. Each jet includes the components shown in cross sectional view in FIG. 2. In this embodiment, ink jet 30 includes a knob 32 which cooperates with bracket 34 and holding finger member 35 to allow removal of holder 16 and nozzle 14 for cleaning purposes, etc.

Special attention now should be drawn to the heating rod which is generally designated by the numeral 38. Heating rod 38 includes a shaft or sheath 40 of thermally conductive material such as copper or nickel alloy. The inner portions of sheath 40 includes a coil (not shown) throughout its longitudinal axis. Heating rods of this type are widely available from various sources. For example, the heating rod distributed by General Electric Co. under the name of "Calrod" cartridge heater has provided satisfactory results. In this preferred embodiment, heating rod 38 is approximately 3 inches long, with a 2½ inch long coil, and is about ¼ inch in diameter. The ends of the coil in heating rod 38 are shown as two wires protruding from plug 44. The ends of the coil are labeled in FIG. 1 as heating rod input 46. Another plug 45 serves to mount and seal the heating rod 38 in printing head 10.

Heating rod 38 is located in a longitudinally extending bore 50 in housing member 52 of printing head 10. Bore 50 runs throughout the length of housing member 52 and is adjacent to the cavities in all three of the ink jets 30 as can be seen in FIG. 1. The center of bore 50 is spaced in this embodiment approximately ½ inch from the major axis of cavity 12 in each of the jets 30.

Figures 3, 3A, 3B, 3C:
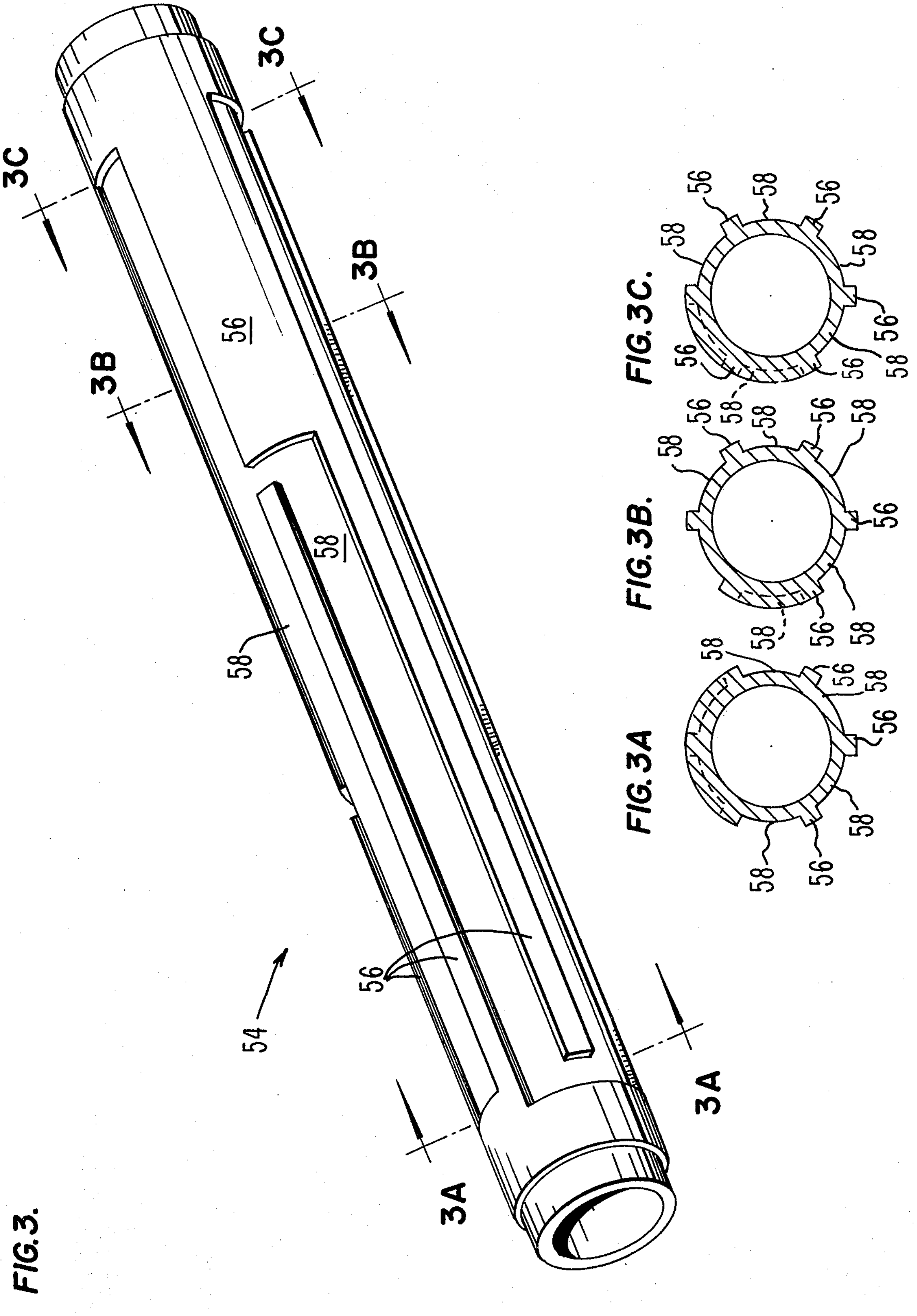
FIGS. 3, 3A, 3B, and 3C illustrate an enlarged perspective view and cross sectional views, respectively, of a heat sink sleeve for the heating rod as embodied in this invention.

A metallic, thermally conductive heat sink sleeve 54, surrounds the sheath 40 of heating rod 38 as can be seen most clearly in FIG. 2. Heating rod sheath portion 40 is press fitted in sleeve 54 so that there is a good thermal connection therebetween. Sleeve 54 is made of aluminum in this embodiment and is shown in more detail in FIG. 3. Sleeve 54 includes a plurality of radially extending rib portions 56. Rib portions 56 define a tortuous groove 58 in the periphery of sleeve 54. Groove 58 runs not only around the periphery of sleeve 54, but also runs up and down the major longitudinal axis of sleeve 54. Sleeve 54 is mounted in bore 50 so that the outer portions of ribs 56 abut the inner walls defining bore 50. In such manner, ribs 56 and the inner walls of bore 50 form a tortuous sealed channel defined by grooves 58 for flowing ink therethrough.

Printing head housing member 52 includes an upper passageway 60 connecting cavity 12 with bore 50 as can be seen most clearly in FIG. 2. An ink inlet member 62 connects with bore 50 diametrically opposite from passageway 60. Inlet member 62 includes a threaded receptacle 64 which cooperates with a correspondingly threaded portion of housing member 52. A hose 66 for inlet member 62 connects the receptacle 64 with an ink reservoir and pump, for example as described more clearly in the referenced patent application Ser. No. 577,667. An opening 68 in hose 66 and receptacle 64 provides a passageway through which ink may be fed under pressure by the pump into bore 50. The ink enters bore 50 and then follows the tortuous path defined by groove 58 in sleeve 54. In such manner, the ink is heated to approximately the temperature of heating rod 38. By forcing the ink to take an elongated path up and down and around the longitudinal axis of heating rod 38, the ink is insured to be heated to the same temperature as heating rod 38. The configuration of the sleeve groove 58 is such that the ink will travel the same distance from inlet opening 68 to the passageway 60 in each of the three spaced ink jets 30. Consequently, the ink temperature in each ink jet cavity will be uniform. From passageway 60 the ink is forced into cavity 12. Pressure oscillations from vibratory component 18 force the ink out of cavity 12 through nozzle 14 in the form of droplets which form characters on the printing medium (not shown), such as paper. In this embodiment, heating rod 38 is preferably heated to a temperature of approximately 110° F. Of course, this temperature may be varied as desired according to various parameters, such as the type of ink used. However, by keeping the ink at a preselected temperature just prior to droplet generation, the viscosity of the ink can be controlled to an accurate degree. We have discovered that such accurate control of ink temperature provides accurately controlled viscosity which, in turn, promotes a printed character of extremely fine resolution. By controlling the ink viscosity in such manner, the compressability of the ink can be maintaned at a constant level. Accordingly, the sound wave propogation through the ink in cavity 12 will remain constant to insure proper droplet formation. If the viscosity is too high, the droplets will form too late to be properly charged. If the viscosity is too low, then the ink droplets will tend to "splash" onto the printing media. Also, undesirable satelite droplets have been found to be formed if the viscosity is not maintained at a constant level.

Under normal operating conditions, the ambient temperature of the room in which the printer is used can foreseeably vary approximately ±35° F. Consequently, we have found that it is preferable to provide means for controlling the temperature of heating rod 38 in order to insure that the temperature of the ink in cavity 12 remains at its desired temperature regardless of ambient conditions. The remaining description of this invention provides an electronic control circuitry for accomplishing this purpose.

Thermocouple 70 senses the temperature of the ink in cavity 12 just prior to dispersement. Thermocouple 70 in this invention is housed in stud assembly 72 which is mounted in lower portions of housing member 52. The hot junction 74 of thermocouple 70 terminates adjacent to heating rod 38 and is in thermal contact with the ink therein. In this preferred embodiment, thermocouple 70 is made of one wire of copper, with other wire made of Constantan, an alloy of copper and nickel. Thermocouple 70 provides a voltage output 76 as a function of the temperature of the ink in cavity 12. While thermocouple 70 has been mounted adjacent to heating rod 38 in this embodiment due to circuit delay design considerations, thermocouple may be mounted in other locations in printing head 10. For example, it can be mounted directly above cavity 12 in upper portions of the printing head. In any case, thermocouple 70 should sense the temperature of the ink after or at least during heating by heating rod 38.

Figure 4:
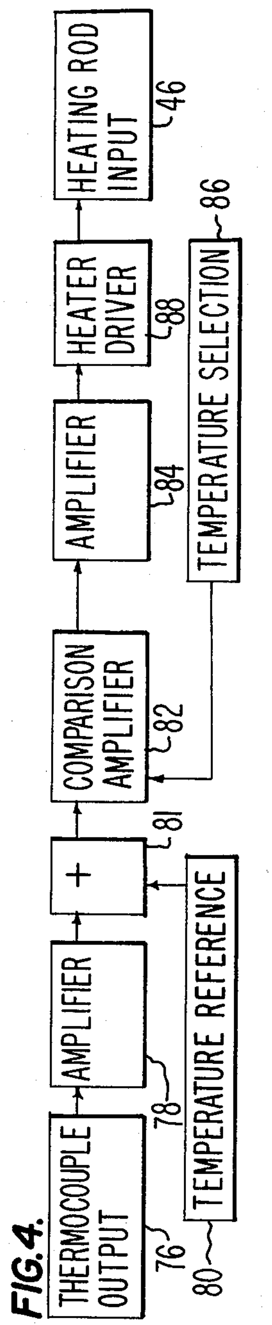
FIG. 4 is a block diagram showing one embodiment of the electrical control circuitry used to selectively energize the heating rod.

FIG. 4 shows a block diagram of the electrical control circuitry used to selectively energize heating rod 38 in order to maintain the ink at a preselected temperature regardless of ambient conditions. The thermocouple output 76 is fed into an amplifier circuit 78 wherein the voltage of thermocouple output 76 is amplified and noise in that signal is removed. A temperature reference circuit 80 provides a means for adjusting the thermocouple output so that it is independent of the cold junction temperature of the thermocouple. Summing junction 81 combines the output of amplifier 78 and temperature reference circuit 80. The output of summing junction 81 will be independent of the cold junction temperature and consequently, will be representative only of the ink temperature in cavity 12. This output is then compared by a comparison amplifier circuit 82 with a voltage which represents the preselected temperature at which the ink in cavity 12 is desired to be maintained. Temperature selection circuit 86 provides such a voltage output which is representative of this desired or preselected temperature. Comparison amplifier circuit 82 provides an output which is indicative of the temperature differential between the ink temperature in the cavity and the preselected temperature. This output will be amplified by amplifier 84 which is coupled to heater driver circuit 88. Heater driver circuit 88 provides a power output which is used to energize the heating rod 38. The output of heater driver circuit 88 is fed back to the heating rod input 46. The above block diagram represents a closed loop feedback circuit in which the temperature of the ink in cavity 12 is sensed by thermocouple 70 and which selectively energizes heating rod 38 when the output from thermocouple 70 denotes that the ink is below a preselected temperature. Analogously, if the temperature sensed by the thermocouple 70 is above the preselected temperature, the control circuitry will deenergize the heating rod 38.

Figure 6:
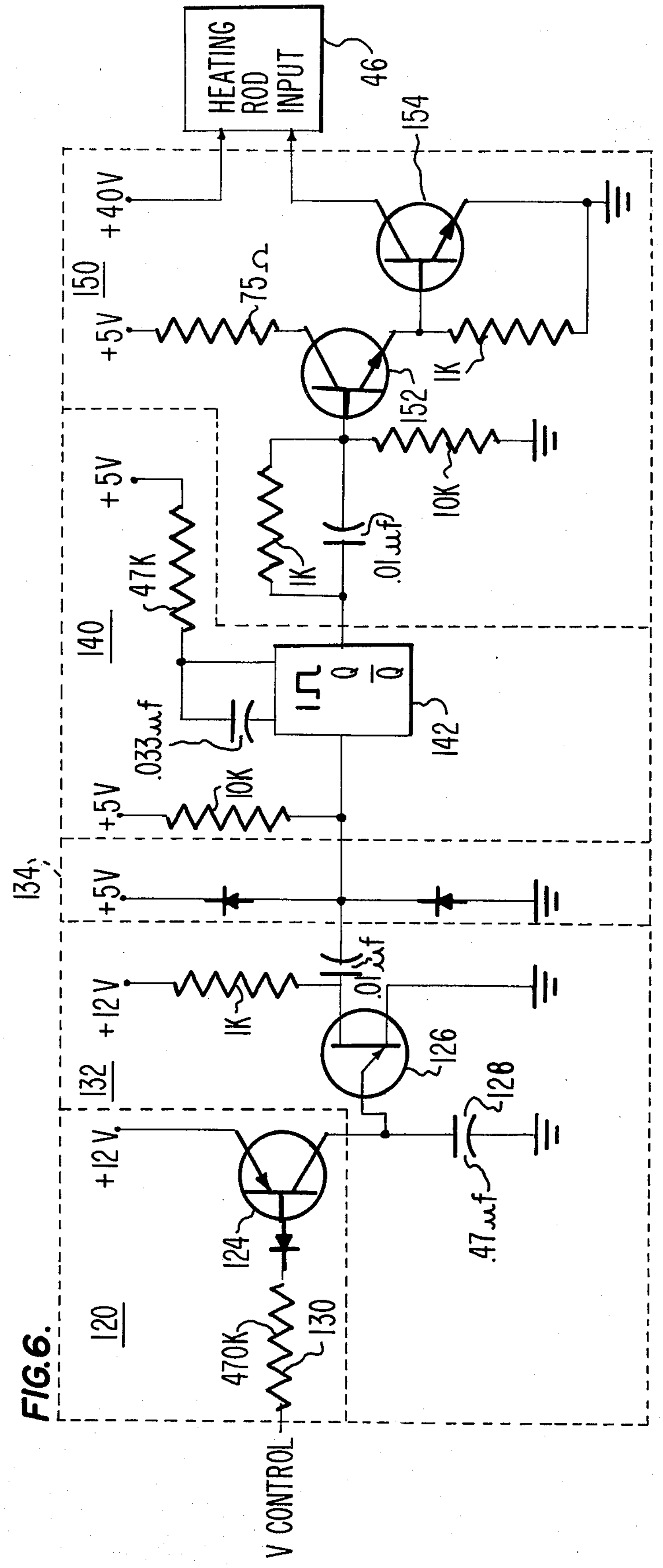
FIG. 6 is a schematic diagram of the electrical circuitry for the heater driver circuit.
Figure 5:
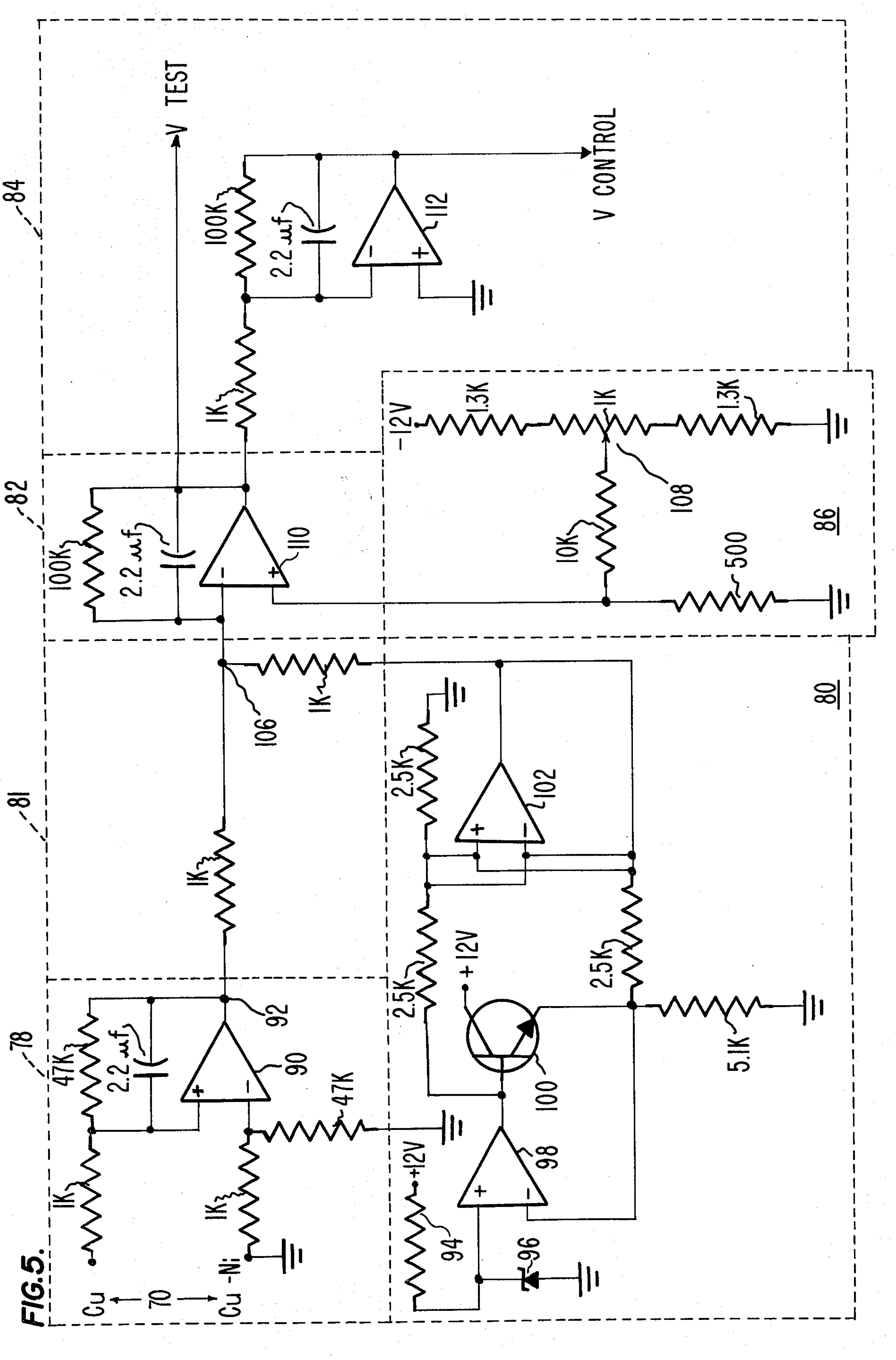
FIG. 5 is a schematic diagram of the electrical control circuitry shown in FIG. 4 except for the heater driver circuit.

FIG. 5 shows one embodiment of the electrical control circuitry shown in block diagram form in FIG. 4 except for the heater driver circuit 88 which is shown in detail in FIG. 6. A detailed schematic of the amplifier circuit 78 is shown in FIG. 5. Thermocouple 70 produces a temperature dependent voltage output of approximately 42.4 uV/° C. The thermocouple 70 wires are connectd to an amplifier 90 which amplifies the voltage developed at hot junction 74 to approximately 2 mv/° C at node 92. Noise from the thermocouple output can be removed internally by amplifier 90 or a suitable low pass RC network (not shown) can be employed if desired.

The dashed block 80 shows the temperature reference circuit in more detail. A resistor 94 and 5.1 volt zener diode 96 provide a constant voltage source for amplifier 98. The anode of zener diode 96 is coupled to the emitter of transistor 100 to clamp the emitter at 5.1 volts. In such manner, using the voltage regulator principle, all current necessary to maintain this 5.1 volt potential at the emitter is derived from the transistor 100 thereby maintaining a constant emitter current.

The base-emitter voltage, $V_{be}$, of the transistor 100 is used as a means for adjusting thermocouple output 76 so that it is independent of the cold junction temperature for the thermocouple 70. The transistor 100 is mounted so that it is in thermal contact with the same ambient conditions as the cold junction of thermocouple 70. In the preferred embodiment, transistor 100 is mounted on the same circuit board which amplifier 90, the location of the cold junction, is mounted. Amplifier 102 is coupled across the base and emitter of transistor 100. Amplifier 102 is used in the inverting mode. The output of amplifier 102 can be represented by the equation $$V_{102} = -V_{be} = -\left[V_o + \frac{dV_o}{dT_2} T_2\right] \qquad (1)$$

$$= -V_o + 2\ \text{mv/° C}(T_2)$$

where, $T_2$ = thermocouple cold junction temperature (° C) = temperature of transistor 100

$V_o$ = 0.6v = base-emitter voltage of a silicon bipolar transistor at room temperature (~25° C); and $dV_{o/dT}$ = −2 mv/° C for such a transistor.

The output of thermocouple 70 is represented by the equation $$V_{70} = \kappa\,(T_1 - T_2) \qquad (2)$$

where, $T_1$ = thermocouple hot junction temperature (° C)

$K$ = thermocouple constant (42.4 uV/° C for Constantan - Copper thermocouple) Amplifier 90 multiplies K by 47 yielding an output for amplifier 90 of $$V_{90} = 47(42.4\ \text{mv/° C})\ [T_1 - T_2] = 2\ \text{mv/° C}\ (T_1) - 2\ \text{mv/° C}\ (T_2) \qquad (3)$$

Summing junction 106 adds equations (1) and (3) to yield $$V_{106} = V_{102} + V_{90} = [-V_o + 2\text{mv/° C}(T_2)] + [2\text{mv/° C}(T_1) - 2\text{mv/° C}(T_2)] = 2\text{mv/° C}(T_1) - V_o \qquad (4)$$

As can be seen from equation (4) the output of summing junction 106 is independent of the cold junction temperature, $T_2$. The temperature reference circuit 80 utilizes the temperature dependent base-emitter voltage of transistor 100 to provide an output which cancels the cold junction temperature factor in the thermocouple output. Consequently, the summing junction output, $V_{106}$, is affected only by the temperature of the ink in the cavity 12. It is not affected by the cold junction temperature. Accordingly, it does not matter where the cold junction of the thermocopule is located. This is extremely important inasmuch as the cold junction is often located in a place where the temperature is variable and may nearly equal the temperature at the hot junction in some instances. Such is the case where the cold junction is affected by the heat generated by the machine itself. The temperature reference circuit 80 eliminates this undesirable phenomena and cooperates with amplifier circuit 78 to produce an output at summing junction 106 which depends solely upon the hot junction temperature, the temperature of the ink in the cavity.

Dashed block 86 shows a schematic of the temperature selection circuit embodied in this invention. Temperature selection circuit 86 provides a voltage which is representative of the temperature at which it is desired for the ink to be maintained. In this embodiment, temperature selection circuit 86 includes a voltage divider network including a variable resistor 108. As more resistance of resistor 108 is included in the series connected circuit coupled to the "+" side of differential amplifier 110, an increased amount of voltage will appear at the "+" input of amplifier 110. The voltage appearing at the "+" side of amplifier 110 is a direct function of the temperature at which the ink is desired to be maintained. In this preferred embodiment, the voltage of −0.563 volts at amplifier 110 represents the temperature of approximately 110° F.

Comparison circuit 82 includes differential amplifier 110 which in effect compares the input at "−" with the input at "+". The input at "−" from summing junction 106 represents the voltage output from summing junction 106, representing the temperature of the ink just prior to droplet generation. The voltage at the "+" input represents the temperature at which the ink is desired to be maintained. If the ink is at a temperature higher than the preselected temperature, amplifier 110 will provide a negative output. However, if the temperature of the ink is below the preselected temperature, amplifier 110 will provide a positive output voltage signal which is proportional to the difference between the temperature of the ink and the temperature at which it is desired to be maintained. This output is then amplified by the amplifier circuit designated by the numeral 84. Amplifier 112 is used in the inverting mode and thus provides an amplified negative voltage output, designated as $V_{control}$, which signals that the temperature of the ink is below the preselected temperature. Similarly, $V_{control}$ will be positive if the ink temperature is higher than the preselected temperature. In summary, the output, $V_{control}$, will be proportional to the voltage differential between the actual temperature of the ink and the temperature at which it is desired to be maintained. $V_{control}$ will be negative if the ink temperature is lower and will be positive if the ink temperature is higher than the preselected temperature.

If desired, a test circuit (not shown) can be coupled to the output amplifier 110. The test circuit may check the output of amplifier 110 to insure that the ink is operating with safe operating parameters. Warning devices can be included to warn the user if the amplifier 110 outputs signals that the ink temperature has reached an undesirable level.

Attention is now drawn to the heater driver circuit 88 shown in FIG. 6. $V_{control}$ is applied to the input of voltage controlled current source circuit 120. Current source circuit 120 includes a PNP transistor 124. The base of transistor 124 is coupled to $V_{control}$. A positive $V_{control}$ signal at the base of transistor 124 will turn the transistor off. A positive $V_{control}$ signal indicates that the ink temperature is above the preselected temperature. Accordingly, there is no need for the heating rod 38 to be energized. Consequently, a positive $V_{control}$ signal will turn transistor 124 off, which in turn shuts off the remainder of the heater driver circuit. Therefore, the heating rod 38 will not be energized.

However, when the ink is below the preselected temperature, $V_{control}$ will be negative. A negative $V_{control}$ signal will turn on transistor 124 to its conducting state. The emitter of transistor 124 is coupled to an oscillator circuit 132. Oscillator circuit 132 includes a charging capacitor 128 for uninjunction transistor 126. The larger the differential between the preselected temperature and the actual temperature of the ink, the larger (more negative) the $V_{control}$ voltage will be. The magnitude of $V_{control}$ in turn determines the amount of current to be fed into charging capacitor 128. The magnitude of current into charging capacitor 128 determines the time at which capacitor 128 will reach a voltage in order to turn on unijunction transistor 126. When the voltage at capacitor 128 increases to overcome the reverse biased voltage of unijunction transistor 126, the unijunction transistor 126 will conduct and capacitor 128 will discharge. Unijunction transistor 126 provides a pulse having a width of approximately 50 nanoseconds every time the capacitor 128 discharges. In other words, as $V_{control}$ increases negatively, the frequency of output pulses from unijunction 126 increases proportionally since the time required to charge up capacitor 128 is proportionally decreased. Consequently, unijunction transistor 126 will provide pulses of increased frequency as the temperature differential between the preselected temperature and the actual temperature of the ink increases.

The output from oscillator circuit 132 is fed into a clamping circuit 134. Clamping circuit 134 clamps the output pulses from unijunction transistor 126 to a maximum voltage of 5 volts. The purpose of clamping circuit 134 is to make the pulses compatible with the logic in the multivibrator circuit 140.

Multivibrator circuit 140 includes a one-shot multivibrator 142. Multivibrator 142 has a preset pulse width of approximately 0.5 milliseconds. As is known in the art, multivibrator 142 will produce an output pulse of this preset pulse width in response to a triggering pulse from oscillator circuit 132. As the frequency of triggering pulses increases, the frequency of output pulses from multivibrator 142 increases in response thereto. The preset pulse width of multivibrator 142 must be of such duration as to enable it to turn on the transistors in power output circuit 150.

Power output circuit 150 includes a parallel coupled RC network for providing rapid response of the transistors 152 and 154. The emitter of transistor 152 is coupled to the base of transistor 154, similar to a Darlington coupled configuration, in order to provide power gain. The collector of the output transistor 154 is connected to one wire of the heating rod input 46. A voltage supply is connected to the other wire of heating rod input 46. When the output circuit 150 is turned on, output transistor 154 conducts and supplies a current of about 1.5 amperes to heating rod 38. It is an important aspect of this invention that the heating rod 38 is energized digitally. By digitally energized we mean that the heating rod is switched either completely on or completely off in response to digital pulses, e.g. from multivibrator circuit 140. As more heat is needed to raise the temperature of the ink to the preselected temperature, an increased number of pulses will emerge from multivibrator circuit 140. Consequently, the heating rod will be turned on a greater number of times per unit time interval. However, when there is little or no need for increased heating of the ink, the heating rod will be turned on a relatively few number of times since the number of pulses from multivibrator circuit 140 will be proportionally decreased. This feature provides a low duty cycle for the heater driver circuit 88. Consequently, the heat generated by the devices, especially by power transistors 152 and 154, will be kept to a minimum as compared to a linear-type circuit in which the devices are continually in their on state. This results in a relatively low power loss in the heater driver circuit 88 thus resulting in less heat being generated in the electronic devices thereby providing more stable circuit operation.

In summary, the present invention provides an improved ink jet printer in which the temperature of the ink is maintained at a preselected temperature just prior to droplet formation. In such manner, better definition of the characters is obtained due to the accurately controlled viscosity of the ink. The means by which this is accomplished can be readily adapted to an ink jet printing head. Moreover, the unique design of the heat sink sleeve 54 insures that the ink is uniformly maintained at the preselected temperature. Furthermore, a distinctive electrical control circuitry as described herein provides means by which the heating rod can be selectively digitally energized to maintain the temperature of the heat at a constant temperature regardless of the ambient conditions in which the ink jet printer may be used.

Therefore, although this invention has been described in connection with one particular example thereof, no limitation is intended thereby except as defined in the appended claims.

What is claimed is:

1. A control system for an ink jet printer in which the ink is maintained at a preselected temperature prior to droplet generation, said system comprising:

a printing head having at least one cavity therein with a discharge orifice at one end thereof, an inlet into said cavity spaced from said discharged orifice, and a bore adjacent to said cavity;

a heating rod in the bore of said printing head;

a heat exchange member in thermal contact with said heating rod;

means for causing the flow of ink over said heat exchange member to receive an evenly distributed amount of heat generated by the heating rod before the ink enters into the cavity through said inlet;

sensing means in the printing head for sensing the temperature of the ink and for providing an electrical output in response thereto; and circuit means for energizing the heating rod when the output from the sensing means signals that the ink in the cavity is below a preselected temperature, thereby maintaining the temperature of the ink in the cavity at the preselected temperature just prior to droplet formation.

2. A control system for an ink jet printer in which the ink is maintained at a preselected temperature just prior to droplet generation, said system comprising:

a printing head having at least one cavity therein with a discharge orifice at one end thereof, an inlet into said cavity spaced from said discharge orifice, and a bore adjacent to said cavity;

a heating rod in the bore of said printing head;

a heat sink sleeve surrounding said heating rod, said sleeve having a plurality of radially extending ribs defining a tortuous groove in the outer surface of the sleeve, outer portions of the ribs abutting the walls of the bore to form a sealed channel defined by the groove for flowing ink therethrough and receiving heat from the heating rod, one portion of said channel being connected to means for forcing ink thereinto, with another spaced portion of the channel being connected to the inlet for the cavity;

sensing means in the printing head for sensing the temperature of the ink and for providing an electrical output in response thereto; and circuit means for energizing the heating rod when the output from the sensing means signals that the ink in the cavity is below a preselected temperature, thereby maintaining the temperature of the ink in the cavity at the preselected temperature just prior to droplet formation.

3. The system of claim 2 wherein the sensing means is a thermocouple.

4. The system of claim 2 wherein said circuit means comprises:

temperature selection circuit means for providing an electrical output representative of a preselected temperature;

comparator circuit means for providing an electrical output indicative of the differential between the outputs of said sensing means and said temperature selection means, said differential representing the difference between the temperature of the ink in the cavity and said preselected temperature; and driver circuit means for supplying power to said heating rod in response to the output from said comparator means.

5. The system of claim 4 wherein said driver circuit means digitally energizes said heating rod with pulses having a frequency proportional to the output of said comparator means.

6. A control system for an ink jet printer in which the ink is maintained at a preselected temperature just prior to droplet generation, said system comprising:

a printing head having at least one cavity therein with a discharge orifice at one end thereof, an inlet into said cavity spaced from said discharge orifice, and a bore longitudinally extending through the printing head adjacent to said cavity;

a heating rod in the bore of said printing head;

a heat sink sleeve surrounding said heating rod serving as a heat exchanger, said sleeve having a plurality of radially extending ribs defining a tortuous groove in the outer surface of the sleeve, outer portions of the ribs abutting inner walls defining said bore to form a sealed channel defined by the groove for flowing ink therethrough and receiving heat from the heating rod, one portion of said channel being connected to a means for forcing ink into the channel, another spaced portion of the channel being connected to said inlet for the cavity whereby ink may be circulated through the tortuous path defined by said sealed channel to maintain the ink at about the same temperature as said heating rod;

a thermocouple mounted in said printing head for sensing the temperature of the ink and for providing an electrical output in response thereto;

reference circuit means for adjusting the thermocouple output so that it is independent of the cold junction temperature of the thermocouple;

temperature selection circuit means for providing an electrical output representative of a preselected temperature at which the ink in the cavity is desired to be maintained;

comparator circuit means for providing an electrical output indicative of the differential between said adjusted thermocouple output and said temperature selection circuit means output, said differential representing the difference between the temperature of the ink in the cavity and said preselected temperature;

oscillator circuit means coupled to said comparator circuit means;

means for activating said oscillator circuit means when the temperature of the ink in the cavity is below said preselected temperature, said oscillator circuit means providing a series of trigger pulses having a frequency proportional to the temperature differential between the ink in the cavity and said preselected temperature;

a one-shot multivibrator coupled to said oscillator circuit means, said multivibrator producing output pulses in response to the trigger pulses from said oscillator means, said multivibrator pulses having a larger pulse width than said trigger pulses; and power output transistor circuit means for energizing said heating rod, said output transistor means being activated by the pulses from said multivibrator whereby said heating rod is digitally energized at a frequency proportional to the differential between the temperature of the ink in the cavity and the preselected temperature at which the ink is desired to be maintained.

7. The system of claim 6 wherein said oscillator circuit includes a charging capacitor and a unijunction transistor.

* * * * *